United States Patent
Martinez et al.

(10) Patent No.: US 7,464,198 B2
(45) Date of Patent: Dec. 9, 2008

(54) SYSTEM ON A CHIP AND A METHOD FOR PROGRAMMING A DMA CONTROLLER IN A SYSTEM ON A CHIP

(75) Inventors: Albert Martinez, Bouc Bel Air (FR); M. William Orlando, Peynier (FR)

(73) Assignee: STMicroelectronics SA, Montrouge (FR)

(*) Notice: Subject to any disclaimer, the term of this patent is extended or adjusted under 35 U.S.C. 154(b) by 298 days.

(21) Appl. No.: 11/187,601

(22) Filed: Jul. 22, 2005

(65) Prior Publication Data
US 2006/0168365 A1    Jul. 27, 2006

(30) Foreign Application Priority Data
Jul. 23, 2004    (FR)    ................................... 04 08202

(51) Int. Cl.
   *G06F 13/28*    (2006.01)
   *G06F 9/26*    (2006.01)
(52) U.S. Cl. ............................ 710/22; 710/26; 711/200; 711/205; 711/206; 711/207; 711/209; 711/216
(58) Field of Classification Search ................... 710/26
See application file for complete search history.

(56) References Cited

U.S. PATENT DOCUMENTS

| | | | |
|---|---|---|---|
| 4,849,875 A | | 7/1989 | Fairman et al. ............... 710/26 |
| 5,623,692 A | * | 4/1997 | Priem et al. ..................... 710/3 |
| 5,659,798 A | * | 8/1997 | Blumrich et al. .............. 710/26 |
| 5,685,011 A | * | 11/1997 | Rosenthal et al. .............. 710/3 |
| 5,708,849 A | | 1/1998 | Coke et al. ..................... 710/22 |
| 5,721,947 A | * | 2/1998 | Priem et al. ..................... 710/4 |

(Continued)

FOREIGN PATENT DOCUMENTS

EP    0 447 145    9/1991

(Continued)

OTHER PUBLICATIONS

Matthias A. Blumrich et al., "Protected, User-Level DMA for the Shrimp Network Interface", High Performance Computer Architecture, 1996, Second International Symposium on San Jose, CA, Feb. 1996, XP010162056, pp. 154-165.

(Continued)

*Primary Examiner*—Niketa I. Patel
*Assistant Examiner*—Steven G Snyder
(74) *Attorney, Agent, or Firm*—Lisa K. Jorgenson; Stephen Bongini; Fleit Gibbons Gutman Bongini & Bianco P.L.

(57) ABSTRACT

A method is provided for programming a DMA controller in a system on a chip. According to the method, a memory management unit translates a programming virtual address into a programming physical address according to a translation table. A first sub-block without discontinuity beginning at the programming physical address and ending at an end address equal to the physical address immediately preceding a first discontinuity is formed, with the first discontinuity being determined by a discontinuity module according to information supplied by a memory management unit. Some of the programming elements intended for the DMA controller are defined according to the first identified sub-block. Also provided is a system on a chip.

22 Claims, 4 Drawing Sheets

U.S. PATENT DOCUMENTS

| | | | | |
|---|---|---|---|---|
| 5,740,464 | A | * | 4/1998 | Priem et al. .................... 710/3 |
| 5,758,182 | A | * | 5/1998 | Rosenthal et al. .............. 710/3 |
| 5,887,190 | A | | 3/1999 | Priem et al. .................... 710/3 |
| 5,890,220 | A | | 3/1999 | Mochida et al. ............. 711/206 |
| 6,219,725 | B1 | | 4/2001 | Diehl et al. .................... 710/26 |
| 6,353,867 | B1 | * | 3/2002 | Qureshi et al. .............. 710/305 |
| 6,615,292 | B1 | | 9/2003 | Sota ............................ 710/22 |
| 6,766,383 | B1 | * | 7/2004 | Pan et al. ..................... 710/22 |
| 6,775,744 | B2 | * | 8/2004 | Yagi et al. ................... 711/119 |
| 7,225,316 | B2 | * | 5/2007 | Thadani ...................... 711/202 |
| 2002/0174272 | A1 | * | 11/2002 | Fujii et al. .................... 710/22 |
| 2004/0255072 | A1 | * | 12/2004 | Kiris .......................... 710/306 |
| 2005/0172047 | A1 | * | 8/2005 | Pettey ......................... 710/20 |
| 2006/0010262 | A1 | * | 1/2006 | Fronte et al. ................. 710/22 |

FOREIGN PATENT DOCUMENTS

| | | | |
|---|---|---|---|
| EP | 447145 A2 | * | 9/1991 |
| EP | 0 589 664 | | 3/1994 |
| EP | 589664 A1 | * | 3/1994 |
| JP | 05216809 | | 8/1993 |
| JP | 05216809 A | * | 8/1993 |

OTHER PUBLICATIONS

French Preliminary Search Report dated Mar. 9, 2005 for French Application No. 04 08202.

Evangelos P. Markatos et al., "User-Level DMA Without Operating System Kernel Modification", High-Performance Computer Architecture, 1997, Third International Symposium on San Antonio, TX, Feb. 1997, XP010213223, pp. 322-331.

Matthias A. Blumrich et al., "Protected, User-Level DMA for the Shrimp Network Interface", High Performance Computer Architecture, 1996, Second International Symposium on San Jose, CA, Feb. 1996, XP010162056, pp. 154-165.

French Preliminary Search Report dated Mar. 7, 2005 for French Application No. 04 08084.

French Preliminary Search Report dated Jan. 25, 2005 for French Application No. 04 06666.

French Preliminary Search Report dated Feb. 21, 2005 for French Application No. 04 07763.

* cited by examiner

SYSTEM ON A CHIP AND A METHOD FOR PROGRAMMING A DMA CONTROLLER IN A SYSTEM ON A CHIP

CROSS-REFERENCE TO RELATED APPLICATIONS

This application is based upon and claims priority from prior French Patent Application No. 04 08202, filed Jul. 23, 2004, the entire disclosure of which is herein incorporated by reference.

FIELD OF THE INVENTION

The present invention relates to silicon integrated systems or SoC (System on a Chip), and more specifically to the programming of the DMA controller of an SoC.

BACKGROUND OF THE INVENTION

A silicon integrated system or System on a Chip (SoC) includes at least a central processing unit (CPU) on which programs can be run, a direct memory access controller (DMA controller), a memory and a memory management unit (MMU). Such SoCs are typically included in electronic devices such as general purpose computers, decoder units or "Set-Top-Boxes", personal digital assistants or PDAs, mobile phones, etc.

In physical memory, a variable size memory space is dynamically allocated to each application program or user program. More specifically, each user program has access to only some of the pages of physical memory. These pages form a memory space (which may be discontinuous) which is addressed at memory bus level by physical addresses, but which is known to the user program via an address space (normally continuous) called a virtual address space which the program accesses with virtual addresses. The virtual address space is specific to the user program. The relationship that links the virtual addresses in the address space and the physical addresses in physical memory is stored in the form of a translation table, called a page table, which is managed by the operating system and stored in main memory. The latest address translations computed by the MMU table reloading unit are stored in a specific cache memory called a TLB (Translation Look-aside Buffer).

Each entry of the TLB, that is, each line corresponding to a translation in the TLB, comprises an address space identifier (ASID) to distinguish identical virtual addresses in different address spaces. Each ASID is linked, on a one-to-one basis, to a defined address space of the system.

The DMA controller performs data transfers between the internal memory of the SoC and peripheral memory devices (for example, hard disks) based on information supplied to it. This information comprises the source physical address of the transfer, the destination physical address of the transfer and the size of the memory area to be transferred.

Conventionally, a program requiring programming of the DMA controller for a DMA transfer running on the SoC in user mode (also called application mode or non-privileged mode) supplies a virtual address, which is the virtual address of the source of the DMA transfer or the destination of the DMA transfer, to the operating system or OS. The OS, running in privileged mode (also called supervisor mode or kernel mode) then takes control, translates the supplied virtual address into a corresponding physical address. It requires in turn storage of the source physical address of the transfer obtained in the source register, storage of the destination address in the destination register and storage of the size in the size register, and this from the virtual address of the registers. The OS then supervises the transfer performed by the DMA controller based on the information stored in its registers and notifies the program initiating the request of the result of the transfer.

The store instructions normally used are of the type: "STORE pa_src@dma_src_reg_adr", "STORE pa_dest@dma_dest_reg_adr" and "STORE size@dma_size_reg_adr", in which "pa_src" is the source physical address, "pa_dest" is the destination physical address, "size" is the size of the memory area transferred, "dma_src_reg_adr", "dma_dest_reg_adr" and "dma_size_reg_adr" are respectively the virtual addresses of the source, destination and size registers. The first instruction above in plain language means "store the data corresponding to the source physical address "pa_src" in the source address register of the DMA controller whose virtual address is "dma_src_reg_adr"". This instruction therefore supplies a virtual address argument "dma_src_reg_adr" and a data argument "pa_src" to be stored at the address supplied as an address argument.

Figure 1:
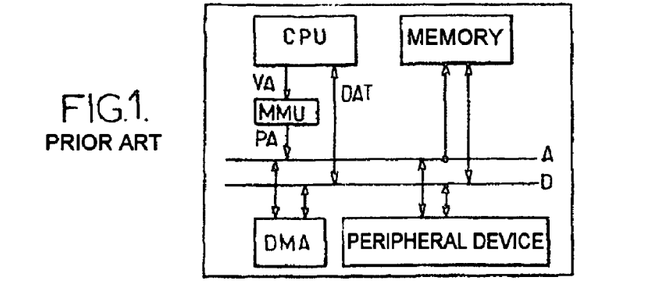
FIG. 1 is a representation of a conventional system on a chip.

With reference to FIG. 1 which shows an example of a conventional SoC, the conventional programming path for the DMA controller is as follows: the virtual address "dma_src_reg_adr" is supplied by the CPU to the MMU over the virtual address bus VA. The MMU translates it into a physical address, checks the rights of access to this physical address, then applies it to the physical address bus PA, via which it is made available in particular to the DMA controller on the general bus A which is linked to a set of entities comprising, for example, disk controllers, physical memory, etc.

In parallel, the source physical address "pa_src" is applied by the CPU to the data bus DAT, from which it is made available on the general data bus D, also linked to the set of entities.

The source address and the address of the source register are respectively applied to the general data bus D and to the general address bus A according to the protocol adopted for bus management. According to the bus management protocols, the physical address of the source register is applied, for example, to the general address bus A virtually at the same time as the source physical address "pa_src" is applied to the general data bus D, or the address of the source register is positioned on the general address bus A one clock pulse before the source physical address is positioned on the general data bus D (for a protocol in which the addresses are positioned one clock pulse before the corresponding data), or even one of the addresses is applied on the rising edge whereas the other is applied on the falling edge, and so on.

The translation is performed by the MMU using a translation table.

A number of attempts have recently been made to program the DMA controller directly by a program running in user mode, instead of by the OS. This stems in particular from the very high proportion of time required for the programming of a DMA controller by the OS, compared to the data transfer time itself that is achieved by the DMA controller.

One of the difficulties encountered originates from the fact that the registers of the DMA controller must be programmed with physical addresses, whereas the programs in user mode do not have access to them and it is not desirable, particularly for security reasons, for them to have access to them.

Various solutions are proposed in the documents "User-Level DMA without Operating System Kernel Modification", by Evangelos P. Markatos and Manolis G. H. Katevenis (Institute of Computer Science, Science and Technology Park of Crete, 1997 IEEE), "Protected User-Level DMA for the Shrimp Network Interface", by M. A. Blumrich et al. (Proc. of the $2^{nd}$ International Symposium on High Performance Computer Architecture, pages 154-165, February 1996) and "Integration of Message Passing and Shared Memory in the Stanford Flash Multi-Processor", by J. Heinlein et al. (Proc. of the 6th International Conference on Architectural Support for Programming Languages and Operating Systems, pages 38-50, 1994).

According to these solutions, implicit addressing (or "shadow addressing") is performed, based on the "STORE" instruction and the prefix 1. The drawback of these solutions is that the addressable memory space in practice is reduced by half, which is very detrimental.

Other solutions are described in French Patent Application No. 04 06666 (STMicroelectronics) which offer the advantage of wasting far less addressable memory space than the solutions described above.

The solutions explained in French Patent Application No. 04 07763, filed on Jul. 12, 2004, and French Patent Application No. 04 08084, filed on Jul. 21, 2004, (STMicroelectronics) do not incur any waste of addressable memory space in practice.

In the conventional systems on a chip where the programming of the DMA controller was driven by the OS, management of the discontinuities in the physical memory space is managed by software, directly by the OS running in privileged mode. Since the OS has access to the physical addresses, this management does not pose any particular problems.

When two memory areas are indicated by two consecutive virtual addresses corresponding to two physical addresses that are not consecutive, there is a discontinuity between these two memory areas in the physical memory space.

The discontinuities appear exclusively in the physical memory space. There is no discontinuity in the virtual address space.

In some of these systems on a chip, the OS programs the DMA controller to perform individual transfers which take place on linear pieces of memory without discontinuity. At the end of each individual transfer, the DMA controller generates an interrupt to indicate the end of the transfer. The OS then programs it with a new linear piece of memory and so on until all of the memory area to be transferred, defined by an application originating from the overall transfer, has been transferred. When the final individual transfer is finished, the DMA controller sends an interrupt to the OS which then informs the application that the transfer is completed.

In certain other of these known systems on a chip, the OS scans a page table of the physical memory space, generates chained lists indicating the discontinuities and, on DMA programming, supplies the relevant chained list to the DMA controller, which was designed to then be programmed according to this chained list ("scatter gather" mechanism) without the intervention of the OS.

Such techniques are described for example in U.S. Pat. No. 5,708,849 (Coke et al.) and EP 0 589 664 (IBM).

In the techniques indicated above that enable the DMA controller to be programmed directly by a program running in user mode, and no longer by the OS, it is no longer possible to implement the conventional solutions to manage the discontinuities, since the OS is no longer invoked for the programming and the user program sees only a linear virtual memory space.

SUMMARY OF THE INVENTION

It is an object of the present invention to provide a programming solution for the DMA controller which can be implemented in the case of programming performed directly by a user program and which allows the discontinuities appearing in the physical memory space to be managed.

A first embodiment of the present invention provides a method for programming a DMA controller of a system on a chip. The system on a chip includes a central processing unit, a memory management unit for translating virtual addresses into physical addresses according to a translation table, a hardware module for checking contiguity, an address bus, a data bus, and the DMA controller. The DMA controller is programmable by applying, to at least one of the data bus and the address bus, programming elements comprising a source physical address, a destination physical address and a size for the data to be transferred. Each user program is linked to a virtual address space and a physical memory space, organized in pages, and each address includes high-order bits indicating a page associated with the address. According to the method, in response to dedicated instructions of a user program that deliver size information and a programming virtual address, which is a source virtual address or a destination virtual address, the programming virtual address is supplied to the memory management unit. The memory management unit translates the programming virtual address into a corresponding programming physical address. The discontinuity module determines the first discontinuity as a function of information supplied by the memory management unit and stored in the translation table. There is formed at least a first sub-block by a memory sub-space without discontinuity identified by a start physical address equal to the programming physical address and an end physical address equal to the physical address immediately preceding a first discontinuity in a part of the physical memory space corresponding, according to the translation table, to the part of the virtual address space beginning at the programming virtual address and of a size equal to the size information delivered by the user program. At least some of the programming elements intended for the DMA controller are defined as a function of the programming physical address and at least the first sub-block, and the programming elements are delivered to the DMA controller by applying the programming elements to at least one of the address bus and the data bus.

A second embodiment of the present invention provides a system on a chip that includes a central processing unit, a memory management unit for translating virtual addresses into physical addresses according to a translation table which also contains the size of each page, a hardware contiguity checking module, an address bus, a data bus, a DMA controller coupled to the address bus and the data bus, and a memory. The DMA controller is programmable by applying, to at least one of the data bus and the address bus, programming elements comprising a source physical address, a destination physical address, and a size of data to be transferred. A virtual address space for each user program corresponds to a physical memory space in the memory, organized as pages, and each address includes high-order bits indicating a page associated with the address. In response to dedicated instructions of a user program that deliver size information and a programming virtual address, which is a source virtual address or a destination virtual address, the memory management unit translates the programming virtual address into a corresponding programming physical address, and the hardware contiguity checking module forms at least a first sub-block of memory space without discontinuity identified by a start physical address equal to the programming physical address and an end physical address equal to the physical address immediately preceding a first discontinuity in a part of the physical memory space corresponding, according to the translation table, to the part of the virtual address space beginning at the programming virtual address and of a size equal to the size information delivered by the user program, the first discontinuity location being determined by the discontinuity module as a function of information supplied by the memory management unit and contained in the translation table. The contiguity checking module defines at least some of the programming elements intended for the DMA controller as a function of the programming physical address and at least the first identified sub-block, and the programming elements are delivered to the DMA controller by applying the programming elements to at least one of the address bus and the data bus.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 2:
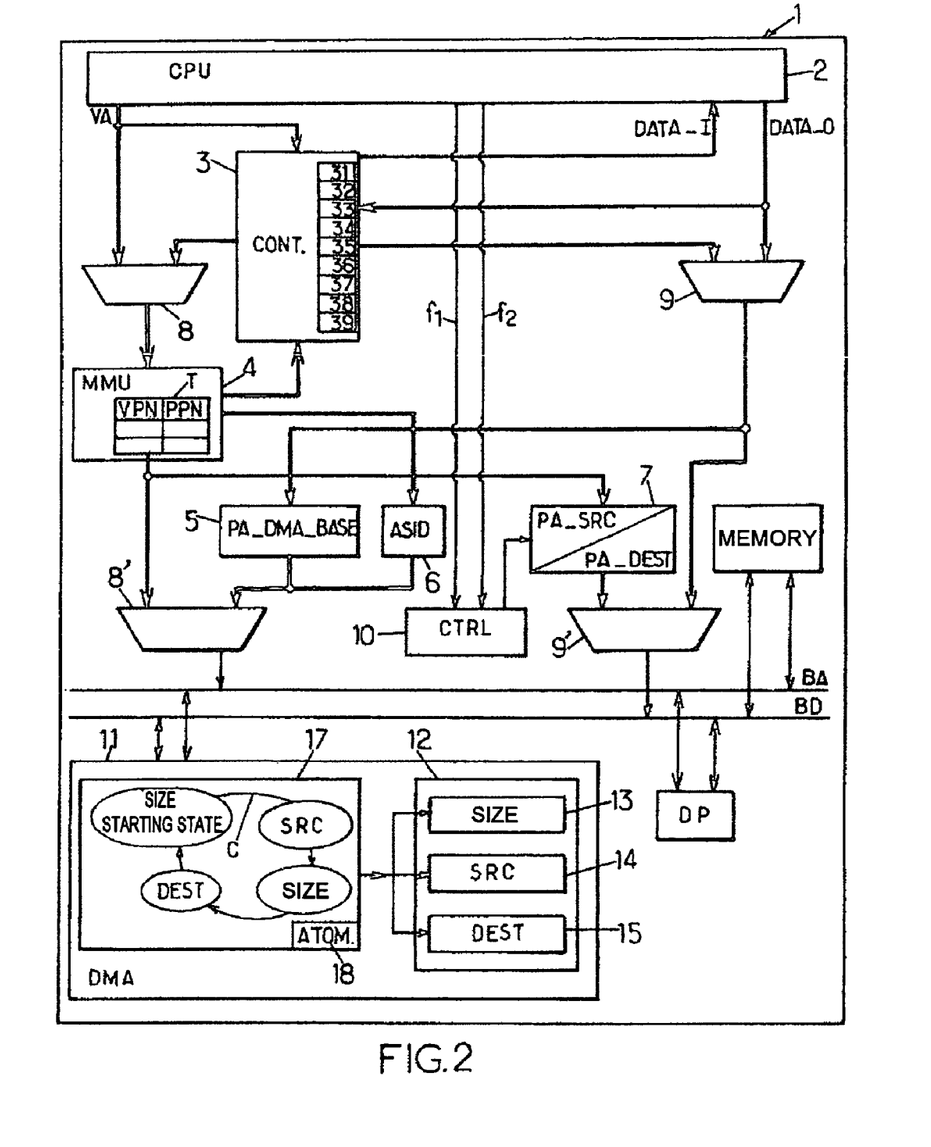
FIG. 2 represents a system on a chip according to an embodiment of the present invention.

FIG. 2 shows a system on a chip (SoC) according to an embodiment of the present invention. In this embodiment, the system on a chip 1 has a 32-bit architecture, such that a virtual address is presented in the form of a page address forming a number and encoded on the high-order bits or VPN (Virtual Page Number), followed by an offset in the page, encoded on the low-order bits.

The system on a chip 1 described with reference to FIG. 2 and in which the present invention is implemented in accordance with this embodiment, and the programming-dedicated instructions considered below, correspond to a programming mode similar to that explained in French Patent Application No. 04 07763.

However, the present invention can be implemented in any system on a chip that allows a DMA controller to be programmed directly by a user program. For example, it can be a system on a chip using a "shadow addressing" technique, or even a system corresponding to those considered in French Patent Application No. 04 06666 or French Patent Application No. 04 08084.

The system on a chip 1 represented in FIG. 2 and corresponding to an embodiment of the present invention comprises a central processing unit or CPU 2, on which user programs are run.

The system on a chip 1 also includes a hardware module for checking contiguity 3 that comprises a programming address register 31, an initial size register 32, a source sub-block size register 33, a destination sub-block size register 33', a first virtual address register 34, a first size register 35, a first physical address register 36, a second virtual address register 37, a second size register 38 and a second physical address register 39.

The system on a chip 1 also includes an MMU 4, a global register 5, an identifier register 6, a buffer register 7, four multiplexers 8, 8', 9 and 9', and a control block 10.

The system on a chip 1 furthermore includes a DMA controller 11, which comprises a set 12 of registers that are required to perform the programming of the DMA transfer. This set 12 of registers comprises a size register 13, a source register 14 and a destination register 15. These size, source and destination registers 13, 14 and 15 are designed to store programming data respectively comprising the size, the source address and the destination address of the DMA transfer to be performed.

The DMA controller 11 also includes a state machine 17 that is designed to select a register from the set 12 and store in it programming data. The state machine 17 includes an atomicity register 18.

In a known way, the MMU 4 translates a 32-bit virtual address that is supplied to it as input, translating only the highest order bits indicating the page. It thus translates the VPN into a physical page number or PPN, using a predefined table T. The translation table T also defines the size of the physical page indicated by the PPN, and a virtual address space specific to each user program using an ASID. The MMU 4 also checks that the user program originating the translation has the appropriate rights to access the memory area addressed by the virtual address supplied as input.

An address bus BA interconnects the multiplexer 8', the DMA controller 11, peripheral devices DP, a RAM memory, etc.

In the same way, a data bus BD interconnects the multiplexer 9', the DMA controller 11, the peripheral devices DP and the RAM memory.

A virtual address bus VA includes a branch linking the CPU 2 to an input of the multiplexer 8. Another branch of the virtual address bus VA links the CPU 2 to the contiguity checking module 3.

The virtual address bus VA is used by the CPU 2 to supply to the MMU 4, via the multiplexer 9 and the contiguity checking module 3, virtual addresses in the context of certain programming instructions for the DMA controller 11. It is also used by the CPU 2 to supply to the MMU 4, via the multiplexer 8, virtual addresses outside of certain programming instructions for the DMA controller 11. An output data bus DATA_O links the CPU 2 to the contiguity checking module 3 and to the multiplexer 9, which is also linked to the multiplexer 9'.

The multiplexer 9 is also linked to the contiguity checking module 3. The buffer register 7 is linked to the multiplexer 9'.

An input data bus DATA_I links the contiguity checking module 3 to the CPU 2. (In practice, the buses DATA_O and DATA_I can be the same physical bidirectional bus).

The input of the MMU 4 is linked to the multiplexer 8. The output of the MMU 4 is linked with the buffer register 7, the identifier register 6 and the multiplexer 8', which is linked with the identifier register 6 and the global register 5.

The control block 10 is linked to the contiguity checking block 3 and to the multiplexers 8, 8', 9 and 9'. The control block 10 controls these multiplexers according to instructions received by the CPU 2, to form output elements from the elements supplied as input to the multiplexers.

The control block 10 also controls the contiguity checking module 3 to process information that is present on the address bus VA or on the data bus DATA_O, when this information concerns DMA programming.

The set 12 of registers of the DMA controller 11 is linked to a physical base subaddress PA_DMA_BASE, which is a page address, encoded on the high-order bits.

The state machine 17 of the DMA controller 11 is designed, when it detects the presence of the base subaddress PA_DMA_BASE in the high-order bits of a word M placed on the address bus BA, to select a predefined register from the registers 13, 14, and 15 of the set 12 according to the current state of the state machine 17 in accordance with an ordered cycle C of states, which comprises a starting "size" state, followed by a "source" state, then a "size" state, then a "destination" state. The state machine 17 stores in the selected register the data then appearing on the data bus BD.

In the embodiment which will now be described with reference to FIG. 2, the state machine 17 is designed to capture, before actually selecting the register whose address it is pointing to, in a word M applied to the address bus BA and including in the high-order bits the subaddress PA_DMA_BASE, the 8 bits following the subaddress and encoding the $ASID_P$ of the user program.

If the state machine 17 is in the starting state, these 8 bits are stored in the atomicity register 18. Since the state machine 17 then points to the size register 13, it selects the size register 13 and stores in it the data then applied to the data bus BD.

If the state machine 17 points to the size register 13 outside of the starting state, to the source register 14 or to the destination register 15, the 8 bits extracted from the word M applied to the bus BA are compared with those present in the atomicity register 18.

If they do not match, the register pointed to is not selected and the data placed on the data bus BD is not stored. If they match, the register pointed to is selected and the data applied to the bus BD is stored in the selected register.

A user program P is run on the CPU 2 to perform a programming operation on the DMA controller 11 using a 32-bit source virtual address VA_SRC VA_DEST, a 32-bit destination virtual address VA_DEST and a size t0 of the memory area to be transferred.

As indicated above, the address VA_SRC is a number including high-order bits $VPN_{S0}$ indicating a virtual page $P_{S0}$ and including low-order bits indicating an offset $d_S$ in the virtual page $P_{S0}$.

The address indicated by the sum of the address VA_SRC and the size t0 is a number including high-order bits $VPN_{Sn}$ indicating a virtual page $P_{Sn}$ and including low-order bits indicating an offset $d_S'$ in the page $P_{Sn}$.

Figure 4:
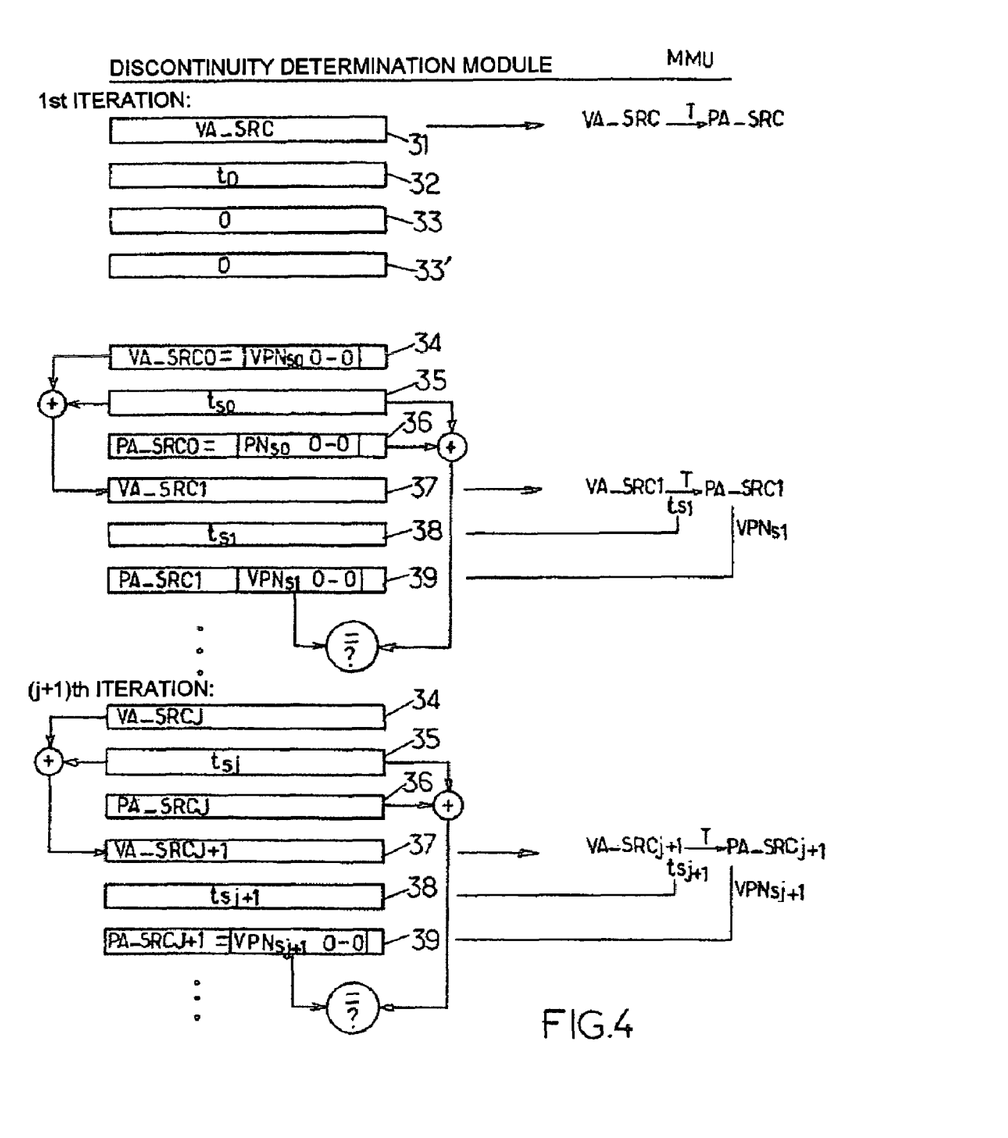
FIG. 4 represents the steps of a discontinuity determination process according to an embodiment of the present invention.

The source virtual address and the size t0 define a source part $P_{VS}$ of the virtual address space, represented in FIG. 4, which is located between the virtual address VA_SRC and the virtual address indicated by the sum of the address VA_SRC and the size t0. The part Pvs extends over n contiguous virtual pages $P_{S0}, \ldots, P_{Sn}$ respectively linked to their VPN numbers: $VPN_{S0}, \ldots, VPN_{Sn}$.

The part $P_{VS}$ includes the memory areas of the page $P_{S0}$ whose address includes high-order bits equal to $VPN_{S0}$ and whose offset is greater than or equal to the offset $d_S$. The part $P_{VS}$ includes all the pages $P_{S1}$ to $P_{Sn-1}$ and includes the memory areas of the page $P_{Sn}$ whose address includes high-order bits equal to $VPN_{Sn}$ and whose offset is less than or equal to the offset $d_S'$.

Each page $P_{Si|i=1 \ to \ n}$ corresponds to a physical page $P'_{Si}$ linked to a respective PPN number ($PPN_{Si|i=1 \ to \ n}$) in the physical memory space. Each number $PPN_{Si}$ is determined by the translation table T from the number $VPN_{Si}$. The translation table T also contains the size $t_{Si}$ of each physical page $P'_{Sn}$.

The part $P_{VS}$ of the virtual address space thus corresponds to a source part $P_{PS}$ of the physical memory space. This part $P_{PS}$ of the physical memory space includes the memory areas of the page $P'_{S0}$ whose address includes high-order bits equal to $PPN_{S0}$ and whose offset is greater than or equal to the offset $d_S$. The part $P_{PS}$ includes all of the pages $P'_{S1}$ to $P'_{Sn-1}$ respectively linked to the numbers $PPN_{S1}$ to $PPN_{Sn-1}$, and includes the memory areas of the page $P'_{Sn}$ whose address includes high-order bits equal to $PPN_{Sn}$ and whose offset is less than or equal to the offset $d_S'$.

It is possible for these physical pages not to be located contiguously in the physical memory space.

In this embodiment, the part $P_{PS}$ of the physical memory space presents a number $k_S$ of discontinuities between physical pages.

Figure 3:
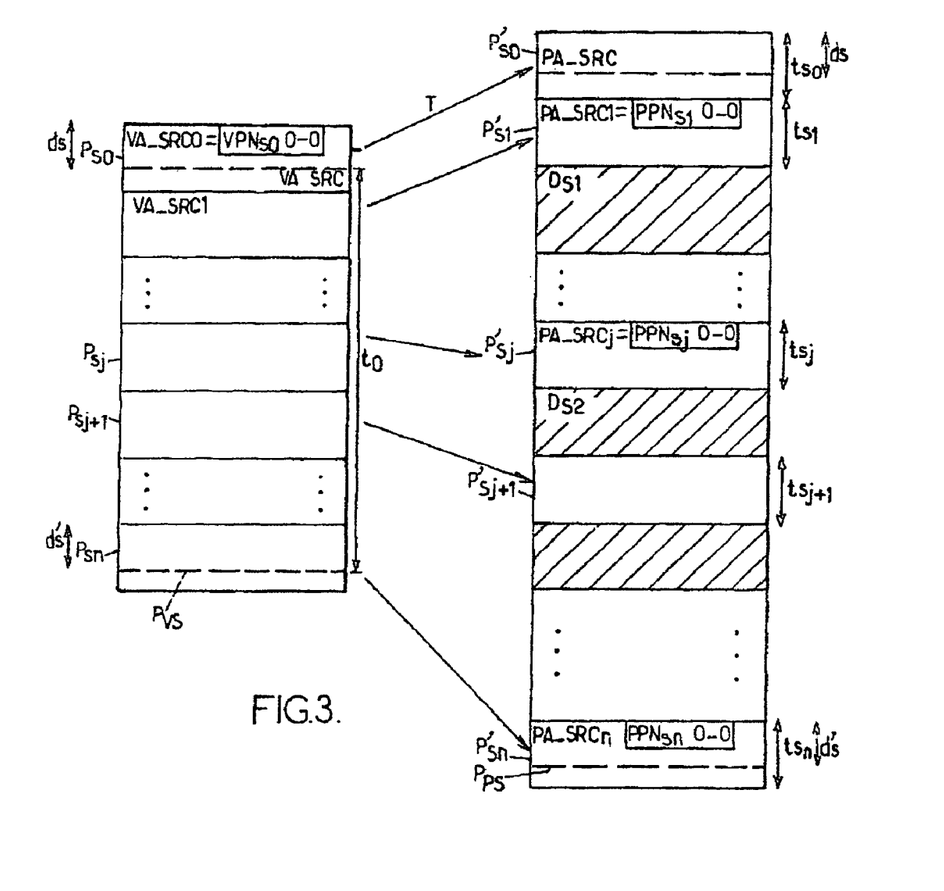
FIG. 3 represents the configuration of the source part of the virtual address space and the corresponding source part in the physical memory space according to an embodiment of the present invention.

For example, as illustrated in FIG. 3, the pages $P'_{S0}$ and $P'_{S1}$ are contiguous while a first discontinuity $D_{S1}$ occurs between the pages $P'_{S1}$ and $P'_{S2}$, a second discontinuity $D_{S2}$ occurs between the pages $P'_{Sj}$ and $P'_{Sj+1}$, and so on.

Similarly, the destination virtual address VA_DEST includes high-order bits equal to $VPN_{D0}$ indicating the virtual page $P_{D0}$ and includes low-order bits indicating an offset $d_D$ in the page $P_{D0}$.

The address equal to the sum of the address VA_DEST and the size t0 includes high-order bits equal to a number $VPN_{Dm}$ indicating the virtual page $P_{Dm}$ and includes low-order bits indicating an offset $d_D'$ in the page $P_{Dm}$.

The destination virtual address and the size t0 define a part $P_{VD}$ of the virtual address space which is located between the virtual address VA_DEST and the virtual address indicated by the sum of the address VA_DEST and the size t0. The part $P_{VD}$ extends over m contiguous virtual pages $P_{D0}, \ldots, P_{Dm}$ with respective VPN numbers $VPN_{D0}, \ldots, VPN_{Dm}$.

The part $P_{VD}$ includes the memory areas of the page $P_{D0}$ whose address includes high-order bits equal to $VPN_{D0}$ and whose offset is greater than or equal to the offset $d_D$. The part $P_{VD}$ includes all of the pages $P_{D1}$ to $P_{Dm-1}$ and includes the memory areas of the page $P_{Dm}$ whose address includes high-order bits equal to $VPN_{Dm}$ and whose offset is less than or equal to the offset $d_D'$.

Each page $P_{Di|i=1 \ to \ m}$ corresponds to a physical page $P'_{Di}$ linked to a respective PPN number ($PPN_{Di|i=1 \ to \ m}$) in the physical memory space. Each number $PPN_{Di}$ is determined by the translation table T from the number $VPN_{Di}$. The translation table T also contains the size $t_{Di}$ of each physical page $P'_{Di}$.

The part $P_{VD}$ of the virtual address space thus corresponds to a part $P_{PD}$ of the physical memory space. This part $P_{PD}$ of the physical memory space is made up of the part of the page $P'_{D0}$ beyond the offset $d_D$, all of the pages $P'_{D1}$ to $P'_{Dm-1}$ and includes the part of the page $P'_{Dm}$ up to the offset $d_D'$.

The part $P_{PD}$ of the physical memory space has $k_D$ discontinuities between physical pages.

The user program P has two successive sequences Seq1 and Seq2, each of at least two instructions which are executed in turn.

Each sequence Seq1 or Seq2 includes the following instructions, with respective arguments:

the "Translate" instruction ("T" instruction), whose format is "Translate (argVA; argD)", where "argVA" is a virtual address argument and "argD" is a data argument, is used to translate the virtual address supplied as an address argument into a corresponding physical address and to store this physical address in the buffer register 7; and the "StoreDMA" instruction ("S" instruction), whose format is "StoreDMA argVA", where "argVA" is a virtual address argument, is used to apply the physical address stored in the buffer register 7 to the data bus BD.

The first sequence Seq1 includes:
"Translate" (VA_SRC; t0)" (instruction "T1"), then:
"StoreDMA VA_SRC" (instruction "S1").
The second sequence Seq2 includes:
"Translate" (VA_DEST; t0)" (instruction "T2"), then:
"StoreDMA VA_DEST" (instruction "S2").

The CPU 2 is designed, when the Translate instruction is executed by a user program, to place the virtual address argument supplied (in this case, VA_SRC) on the bus VA', place the data argument supplied (in this case, t0) on the bus DATA_O and set the wire f1 to the high level. The source and destination sub-block size registers 33 and 33' are set to zero.

When the wire f1 has been set to the high level, the control block 10 controls the contiguity checking module 3 so that it stores the virtual address VA_SRC applied to the address bus VA in the programming address register 31, and the transfer size t0 applied to the data bus DATA_O in the initial size register 32.

At the same time, the virtual address VA_SRC is supplied to the multiplexer 8, which is controlled by the control block 10 to deliver it to the MMU 4. The MMU 4 translates the virtual address argument supplied VA_SRC into a physical address PA_SRC.

The translation by the MMU 4 is performed by determining, using the translation table T and based on the number $VPN_{S0}$ of the virtual page $P_{S0}$ indicated by the virtual address VA_SRC, the number $PPN_{S0}$ of the corresponding physical page $P'_{S0}$. The translation table T also defines the size $t_{S0}$ of the physical page $P'_{S0}$.

The MMU 4 supplies the size $t_{S0}$ and the number $PPN_{S0}$ to the contiguity checking module 3. The contiguity checking module 3 stores the size $t_{S0}$ in the first size register 35. It determines the physical address PA_SRC0 of the start of the page $P'_{S0}$, which includes in the high-order bits the number $PPN_{S0}$ and in the low-order bits a zero offset, and stores it in the first physical address register 36.

The contiguity checking module 3 moreover determines from the virtual address VA_SRC, received previously, the virtual address VA_SRC0 corresponding to the start of the page $P_{S0}$ and stores it in the first virtual page address register 34. This virtual address VA_SRC0 includes high-order bits $VPN_{S0}$ and a zero offset.

Then, once the first virtual address, first physical address and first size registers 34, 36 and 35 are duly completed, the following process, represented in FIG. 4, is undertaken. The contiguity checking module 3 determines a virtual address VA_SRC1 by summing the size $t_{S0}$ stored in the first page size register 35 and the virtual address VA_SRC0 stored in the first virtual address register 34. It stores the virtual address VA_SRC1 in the second virtual address register 37. This virtual address VA_SRC1 is the start address of the page $P_{S1}$ which follows the page $P_{S0}$ in the virtual address space part $P_{VS}$. This virtual address VA_SRC1 includes in the high-order bits the number $VPN_{S1}$.

The contiguity checking module 3 delivers the virtual address VA_SRC1 stored in the second virtual address register 37 to the multiplexer 8, which is controlled by the control block 10 to deliver it to the MMU 4.

The MMU 4 translates the virtual address supplied VA_SRC1 into a physical address PA_SRC1 including the number $PPN_{S1}$ in the high-order bits, using the translation table T and based on the number $VPN_{S1}$ of the virtual page indicated by the virtual address VA_SRC1. The translation table T also defines the size $t_{S1}$ of the physical page $P'_{S1}$.

The MMU 4 supplies the size $t_{S1}$ and the number $PPN_{S1}$ to the contiguity checking module 3. The contiguity checking module 3 stores the size $t_{S1}$ in the second size register 38.

Then it determines the physical address PA_SRC1 corresponding to the start address of the page $P'_{S1}$, which includes in the high-order bits the number $PPN_{S1}$ and a zero offset. It stores the physical address PA_SRC1 in the second physical address register 39.

The contiguity checking module 3 sums the size $t_{S0}$ and the physical address PA_SRC0, and compares the address obtained with the physical address PA_SRC1.

If they match, the size $t_{S0}$ is then added to the number stored in the source sub-block register 33. Then, the virtual address VA_SRC0 stored in the first virtual address register 34 is replaced by the virtual address VA_SRC1, stored in the second virtual address register 37, the physical address PA_SRC0 in the first physical address register 36 is replaced by the physical address PA_SRC1 stored in the second physical address register 39 and the size $t_{S0}$ stored in the first size register 35 is replaced by the size $t_{S1}$ stored in the second size register 38.

This process is then repeated until an inequality is determined on a comparison step, or until the comparison step culminates in the verification of the match between the physical address PA_SRCn (start address of the page $P'_{Sn}$) and the sum of the size $t_{Sn-1}$ and the physical address PA_SRCn−1 (start address of the page $P'_{Sn-1}$). In the latter case, this means that no discontinuity has been detected.

When a first inequality is determined between the sum of the size $t_{Sj}$ stored in the first size register 35 and the physical address PA_SRCj of the start of the page $P'_{Sj}$ stored in the first physical address register 36, and the physical address PA_SRCj+1 of the start of the page $P'_{Sj+1}$ stored in the second physical address register 39, it indicates the presence of a first discontinuity $D_{S1}$ located between the physical pages $P'_{Sj}$ and $P'_{Sj+1}$.

The second size register 38 then contains the size $t_{Sj+1}$ of the page $P'_{Sj+1}$, the first virtual address register 34 then contains the virtual address VA_SRC$_j$ of the start of the first page $P_{Sj}$ and the second virtual address register 37 contains the virtual address PA_SRC$_{j+1}$ of the start of the first page $P_{Sj+1}$.

When an inequality as indicated above has been detected, a first sub-block $SB_{S1}$, with no discontinuity, is determined by the module 3. It starts at the physical address PA_SRC and ends at the end of the physical page $P'_{Sj}$.

The contiguity checking module 3 determines the size $t_{BS1}$ corresponding to the first sub-block $SB_{S1}$, from the offset $d_S$ indicated by the address VA_SRC stored in the programming address register 31 and the sum of the page sizes which is stored in the source sub-block size register 33. The size $t_{BS1}$ duly obtained is stored in this register 33.

Thus, in the page configuration example represented in FIG. 4, after having identified a first match on running the process for the first time, the contiguity checking module 3 determines a virtual address VA_SRC2 by summing the size $t_{S1}$ and the virtual address VA_SRC1. This virtual address VA_SRC2 is the start address of the page $P_{S2}$ which follows the page $P_{S1}$ in the virtual address space part $P_{VS}$. This virtual address VA_SRC2 includes the number $VPN_{S2}$ in the high-order bits.

Then the contiguity checking module 3 delivers the virtual address VA_SRC2 to the multiplexer 8, which is controlled by the control block 10 to deliver it to the MMU 4.

The MMU 4 translates the virtual address supplied VA_SRC2 into a physical address PA_SRC2 including the number $PPN_{S2}$ in the high-order bits, using the translation table T and based on the number $VPN_{S2}$ of the virtual page indicated by the virtual address VA_SRC1. The translation table T also defines the size $t_{S2}$ of the physical page $P'_{S2}$.

The MMU 4 supplies the size $t_{S2}$ and the number $PPN_{S2}$ to the contiguity checking module 3.

The contiguity checking module 3 determines the physical address PA_SRC2 corresponding to the start address of the page $P'_{S2}$, which includes in the high-order bits the number $PPN_{S2}$ and a zero offset.

The contiguity checking module 3 sums the size $t_{S1}$ and the physical address PA_SRC1, and compares the address obtained with the physical address PA_SRC2.

They do not match. The first discontinuity is thus revealed by the contiguity checking module 3, between the pages $P'_{S1}$ and $P'_{S2}$.

The first sub-block without discontinuity thus begins at the physical address PA_SRC and ends at the end of the page $P'_{S1}$.

In parallel with this iterative contiguity checking process run by the module 3, the steps described below are carried out.

The MMU 4 supplies the physical address PA_SRC to the buffer register 7 for storage. Furthermore, it extracts from the translation table T the $ASID_P$ identifying the user program P from which the instruction T1 originates and supplies it to the identifier register 6 for storage. In this example, the ASIDs are encoded on 8 bits.

Then, a word $M_{t1}$ including high-order bits equal to the base subaddress PA_DMA_BASE followed by bits encoding the identifier $ASID_P$ supplied by the MMU 4 following the translation of VA_SRC is formed and supplied as input to the multiplexer 8'.

The control block 10 is designed, in response to the setting of the wire f1 to the high state, to control the multiplexers 9 and 9' so that the data (the size t0) then supplied by the CPU 2 is applied to the data bus BD. It is also designed to control the multiplexer 8' so that the word $M_{t1}$ is applied to the address bus BA.

These applications to the buses BA and BD are performed under the control of the control block 10 at respective moments linked relative to each other (for example, virtually simultaneously, or one clock pulse before the other, etc.) and according to the bus management protocol adopted.

The state machine 17 of the DMA controller 11 is initially in its starting state for DMA transfer programming and therefore points to the size register 13. When it detects the subaddress PA_DMA_BASE in the high-order bits of the word $M_{t1}$ applied to the address bus BA, it extracts the eight bits following the subaddress, which encode the $ASID_P$, and stores them in the atomicity register 18. Then it selects the size register 13 and stores in it the data (the size t0) then applied to the data bus BD. It shifts its pointer to point to the source register 14 according to the cycle C of the state machine 17.

When the second instruction S1 "StoreDMA VA_SRC" of the sequence Seq1 is executed by the user program P, the CPU 2 places the virtual address argument supplied (in this case, VA_SRC) on the bus VA and sets the wire f2 to the high level.

The multiplexer 8 receives the virtual address VA_SRC and is controlled by the control block 10 to supply the address to the MMU 4.

The MMU 4 translates the virtual address argument supplied VA_SRC into a physical address PA_SRC according to the table T, which also contains the $ASID_P$ specific to the user program P. The MMU 4 thus supplies the $ASID_P$ which identifies the user program P from which the instruction S1 originates. This identifier is then compared to the identifier stored in the identifier register 6, which was determined from the first instruction T1 received by the CPU 2.

If they match, a word $M_{SRC}$ including high-order bits equal to the subaddress PA_DMA_BASE stored in the global register 5, followed by bits encoding the identifier $ASID_P$ supplied by the MMU following the translation of VA_SRC performed after receiving the instruction S1, is formed and supplied as input to the multiplexer 8'.

Moreover, if they match, the content of the buffer register 7 storing the source physical address PA_SRC stored on processing the instruction T1 is supplied to the multiplexer 9' by the address instruction processing block 3.

Also the multiplexer 9', or the multiplexer 8', is controlled by the control block 10 to enable the physical address PA_SRC originating from the buffer register 7 to be applied to the data bus BD, or the word $M_{SRC}$ to be applied to the address bus BA, according to the line relating to the instruction S1 in FIG. 3.

The state machine 17 of the DMA controller 11 then points to the source register 14. When it detects the subaddress PA_DMA_BASE in the high-order bits of the word $M_{SRC}$ applied to the address bus BA, it extracts the eight bits following the base subaddress and corresponding to the identifier $ASID_P$, and compares them to the identifier stored in the atomicity register 18.

If the identifiers match, it selects the source register 14 and stores in it the data PA_SRC applied to the data bus BD. It then shifts its pointer to point to the size register 13, according to the cycle C of the state machine 17.

If the state machine 17 detects an inequality between the identifier stored in the atomicity register 18 and the identifier present in the words $M_{DEST}$ and $M_{SRC}$, a failure indication is returned to the CPU 2 on an operation (not detailed here) to supply a status relating to the DMA controller programming operation.

The processing of the first sequence Seq1 for programming the DMA controller 11 is thus completed. The second sequence Seq2 is then executed.

In the same way as was detailed previously from the instruction T1 "Translate (VA_SRC; t0)", on execution of the instruction T2 ("Translate (VA_DEST; t0)") by the user program P, the CPU 2 places the virtual address argument supplied (in this case, VA_DEST) on the bus VA', places the data argument supplied (in this case, the size t0) on the bus DATA_0 and sets the wire f1 to the high level.

The contiguity checking module will determine a first discontinuity $D_{D1}$ and consequently a first sub-block $SB_{D1}$ not presenting any discontinuity, using the registers 31, 32, and 34 to 39. However, the destination sub-block size register 33' is used instead of the source sub-block size register 33.

The first sub-block $SB_{D1}$ starts at the virtual address VA_DEST supplied by the program P and has a size $t_{BD1}$ stored in the destination sub-block size register 33'.

Once the first source sub-block $SB_{S1}$ and this first destination sub-block $SB_{D1}$ are determined, the contiguity checking module 3 compares the sizes $t_{BS1}$ and $t_{BD1}$ respectively stored in the source sub-block size register 33 and the destination sub-block size register 33', selects the smallest size $t_{B1}$=min ($t_{BS1}$; $t_{BD1}$) and applies it as input to the multiplexer 9. The size $t_{B1}$ is the size of an individual sub-block such that on transferring this individual sub-block the DMA controller will encounter no discontinuity in the source memory space $P_{PS}$ or in the destination memory space $P_{PD}$.

In parallel, once the MMU 4 has translated the virtual address argument VA_DEST supplied by the program P into a physical address PA_DEST according to the table T, which also defines the $ASID_P$ specific to the user program P, it supplies the physical address PA_DEST to the buffer register 7 for storage. It also supplies the $ASID_P$, which identifies the user program P from which the instruction T2 originates, to the identifier register 6 for storage.

Then a word $M_{t2}$, including high-order bits equal to the subaddress PA_DMA_BASE stored in the global register 5, followed by bits encoding the identifier $ASID_P$ supplied by the MMU following the translation of VA_DEST, is formed and supplied as input to the multiplexer 8'.

In response to the setting of the wire f1 to the high state, the control block 10 is designed to control the multiplexer 9 so that the size data $t_{B1}$ supplied as input by the contiguity checking module 3 is delivered to the multiplexer 9'. The control block 10 is also designed to control the multiplexer 9' so that the data $t_{B1}$ supplied as input is applied by the multiplexer 9' to the data bus BD, and to control the multiplexer 8' so that the word $M_{t2}$ is applied to the address bus BA, as represented in FIG. 3.

The state machine 17 of the DMA controller 11 then points to the size register 13, according to the cycle C. When it detects the subaddress PA_DMA_BASE in the high-order bits of the word $M_{t2}$ applied to the address bus BA, it extracts the eight bits following the base subaddress and corresponding to the identifier $ASID_P$ and compares them to the identifier stored in the atomicity register 18.

If they match, it selects the size register 13 and stores the size $t_{B1}$, which is on the data bus BD. The state machine 17 then increments its pointer to point to the destination register 14 according to the cycle C.

When the instruction S2 ("StoreDMA VA_DEST") is executed by the user program P, the CPU 2 places the virtual address argument supplied (in this case, VA_DEST) on the bus VA and sets the wire f2 to the high state. The virtual address VA_DEST is then delivered by the multiplexer 8 to the MMU 4.

The MMU 4 translates the virtual address that is supplied VA_DEST into a physical address PA_DEST according to the table T, which also defines the $ASID_P$ specific to the user program P. The MMU 4 supplies the $ASID_P$ which identifies the user program P from which the instruction S2 originates. The $ASID_P$ is then compared to the identifier stored in the identifier register 6 which was determined from the instruction T2 received by the CPU 2.

If they match, a word $M_{DEST}$, including high-order bits equal to the base subaddress PA_DMA_BASE stored in the global register 5, followed by bits encoding the identifier $ASID_P$ supplied by the MMU following the translation of VA_DEST in response to the instruction S2, is formed and supplied as input to the multiplexer 8'.

Moreover, if the identifiers match, the content of the buffer register 7 storing the source physical address PA_DEST is supplied to the multiplexer 9'.

And as in the first sequence Seq1, the multiplexer 9', or the multiplexer 8', is controlled by the control block 10 to allow the physical address PA_DEST originating from the buffer register 7 to be applied to the data bus BD, or the word $M_{DEST}$ to be applied to the address bus BA, according to the line relating to the instruction S2 in FIG. 4.

The state machine 14 of the DMA controller 11 then points to the destination register 15. When it detects the subaddress PA_DMA_BASE in the high-order bits of the word $M_{DEST}$ applied to the address bus BA, it extracts the eight bits following the base subaddress and corresponding to the identifier $ASID_P$ and compares them to the identifier stored in the atomicity register 18.

If the identifiers match, it selects the destination register 15 and stores in it the data PA_DEST then applied to the data bus BD. Then it increments its pointer according to the cycle C of the state machine 17 and then returns to the starting state of the cycle C.

Processing of the sequence Seq2 for programming the DMA controller 11 is thus completed.

The DMA controller is now programmed with the source data PA_SRC, the size data $t_{B1}$ of the individual sub-block and the destination data PA_DEST and will perform the DMA transfer.

The size $t_{B1}$ thus determined and supplied to the DMA controller is such that no discontinuity between physical pages either in the source part $P_{PS}$ or the destination part $P_{PD}$ will be encountered by the DMA controller on the transfer.

In this embodiment, the contiguity checking module 3 also compares the size t0 initially delivered by the user program P with the size $t_{B1}$ that it has determined and supplied to the DMA controller. If they are different, the contiguity module sends to the CPU 2 via the data bus DATA_I an information message containing the size of the transfer $t_{B1}$ actually delivered to the DMA controller 11 or containing the location of the discontinuities $D_{S1}$ and $D_{D1}$ that were determined, so that the user program P can reprogram the transfer of the elements that could not be transferred following the execution of the two sequences of instructions Seq1 and Seq2 described above.

The use of the identifiers (in this case, of the ASID relating to the user program P which generated the instruction) enables the atomicity of the instructions which follow each other to be checked. This arrangement enables the insertion of an instruction originating from a user program P' different from the user program P to be identified and the information required for the DMA transfer not to be mixed. This reinforces the security of the system against fraudulent attempts to access the external memory via DMA access. Furthermore, when the DMA controller is a multi-channel controller, that is, designed to complete in parallel a number of sets of registers of the type of the set 12, the identifier can also be used to select the size register, the source register, the destination register or the status register, from the set concerning the program P.

In another embodiment in which the atomicity of the transfer elements can be guaranteed without having to compare an identifier (for example the ASID) stored in a register (in this case, the register 6) with an identifier determined by the MMU from a new address argument, the system on a chip is designed to initiate the backing up of the contents of the registers 5, 6, 7, and 31 to 39 on each change of context (that is, on each change of user program).

In another embodiment, the contiguity checking module 3 is designed, when it receives the first programming instruction for the DMA controller from the user program P, to select a memory page $P_{blocks}$ of physical address PA_BLOCKS in the physical memory space specific to the program P, and store in it the first physical address PA_SRC0 that is determined on executing the process.

Then, once it has determined a first source sub-block $SB_{S1}$ with a size $t_{BS1}$, the contiguity checking module 3 stores in this memory page $P_{blocks}$ after the data already contained in it the size of the first source sub-block $t_{BS1}$ that is determined.

Then, the contiguity checking module 3 repeats the process of determining sub-blocks from the location where it was stopped to determine $t_{B1}$ up to comparing the physical address PA_SRC$_n$, in the manner detailed below.

Once a new discontinuity located between the pages $P'_{Sj}$ and $P'_{Sj+1}$ is determined, the contiguity checking module 3 resets the content of the source sub-block size register 33 to zero. Then, as previously, it replaces the content of the first size register 35 with that $(t_{sj+1})$ of the second size register 38, the content of the first physical address register 36 with that (PA_SRC$_{j+1}$) of the second physical address register 39 and the content of the first virtual address register 34 with that (VA_SRC$_{j+1}$) of the second virtual address register 39, and repeats the process until a new inequality is detected or the end of the part $P_{PS}$ is reached. It stores the size of the new sub-block that is determined following the detection of the new discontinuity, then the physical address PA_SRC$_{j+1}$ contained in the first physical address register 36 in the memory page $P_{blocks}$ following the data already contained there.

A number $k_s$ of sub-blocks are thus detected in the part $P_{PS}$ of the physical memory space.

Therefore, once the $(k_{s+1})$ sub-blocks separated by the discontinuities in the part $P_{PS}$ of the physical memory have been isolated, a memory page $P_{blocks}$ containing the addresses and the sizes of these various sub-blocks is obtained.

Similarly, by carrying out the same steps from the destination virtual address supplied by the user program P via the instruction "T2", a number $(k_{D+1})$ of sub-blocks separated by $k_D$ discontinuities in the part $P_{PD}$ of the physical memory space is detected, and the memory page $P_{blocks}$ also contains all the information relating to the address and the size of these $(k_{D+1})$ sub-blocks.

Figure 5:
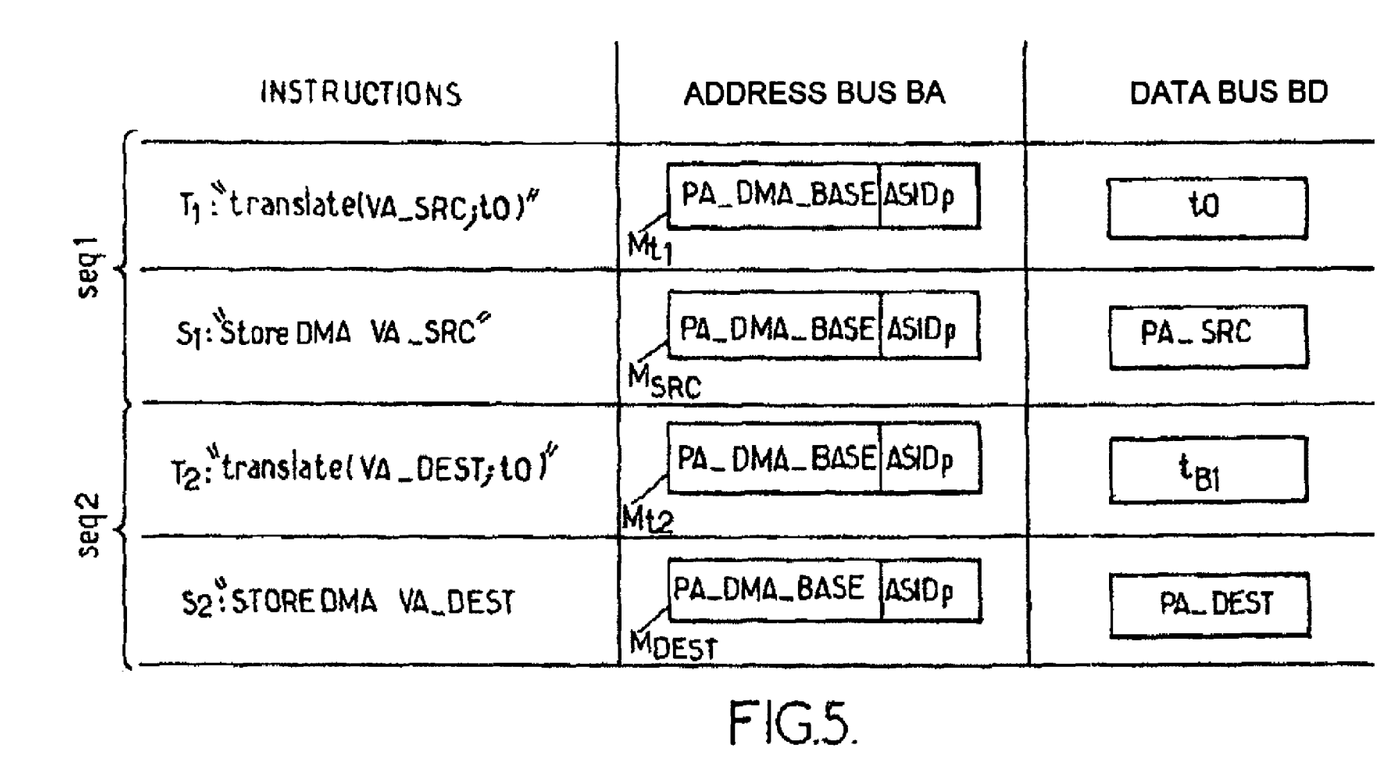
FIG. 5 represents the various elements applied to the data bus and the address bus to program a DMA controller in an embodiment of the present invention.

In this embodiment, there is no need to send to the DMA controller the words $M_{t1}$, $M_{SRC}$, $M_{t2}$ and $M_{DEST}$ on the address bus BA, or to send the data t0, $t_{B1}$, PA_SRC and PA_DEST on the data bus BD (see FIG. 5). In practice, all this information is contained in the page $P_{blocks}$.

In this embodiment, the DMA controller 11 is sent the number PPN of the memory page $P_{blocks}$, for example by applying it to the address bus BA or to the data bus BD after executing the instruction S2.

There is then no longer a need to store the ASID in a register of the DMA controller, or to proceed with the ASID comparisons since each user program will have its own memory page $P_{blocks}$ attached. There will therefore no longer be problems of atomicity at the DMA controller level.

In this embodiment, the DMA controller is designed, on receipt of this number PPN, to retrieve from the page $P_{blocks}$ the data relating to the sizes and the positions of the various sub-blocks in the source part $P_{PS}$ and in the destination part $P_{pp}$ and to execute the transfer according to any discontinuities thus identified.

This DMA controller is, for example, adapted from a known scatter-gather type DMA controller. Such a DMA controller no longer includes a state machine since it is able to be self-programmed with the linked lists present in the page $P_{blocks}$.

This embodiment enables the transfer initially ordered by the user program P to be programmed without having, as in the first embodiment detailed above, to invoke the user program to replay a set of programming instructions when a discontinuity has been encountered.

The generation of two lists of discontinuities, one relating to the discontinuities present in the source part $P_{PS}$ and the other relating to the discontinuities present in the destination part $P_{PD}$ of the physical memory space, has been described above.

In this case, the DMA controller must be designed to determine the size of the successive transfers to be performed on continuous individual sub-blocks, from these two lists defined in the memory page $P_{blocks}$, so that on these individual sub-blocks no discontinuity will be encountered in the source part $P_{PS}$ or in the destination part $P_{PD}$ (for example, from the sizes $t_{BS1}$ and $t_{BD1}$, it will determine a first individual transfer sub-block size $t_{B1}$=min $(t_{BS1}, t_{BD1})$).

In another embodiment, the contiguity module extracts from these two discontinuity lists a single list primarily defining these individual sub-blocks enabling an individual transfer of the DMA controller, and this without encountering any discontinuity. This single list is stored in the memory page $P_{blocks}$ (in place of the two initial lists), the address of which is supplied to the DMA controller.

In the two main embodiments described above (determination of an individual sub-block size $t_{B1}$ transmitted to the DMA controller/generation of a memory page $P_{blocks}$ with the definition of sub-blocks, and transmission of the page address to the DMA controller), the first step is to look for one or more discontinuities in the source part $P_{PS}$ from the size t0 and source virtual address VA_SRC elements. Then, one or more discontinuities are sought in the destination part $P_{PD}$ from the size t0 and destination virtual address VA_DEST elements.

In a variant, the three parameters VA_SRC, VA_DEST and t0 are supplied to the discontinuity module which processes in turn a page of the source space $P_{PS}$ and then a page of the destination space $P_{PD}$, to determine the presence of at least one discontinuity.

This way, by applying this variant to the first embodiment, the size $t_{B1}$ of the first individual transfer sub-block is determined immediately (without having to select a minimum size between the size of the first source sub-block and that of the first destination sub-block).

Also, in the case where this variant is applied to the second embodiment, a single list of individual sub-blocks is obtained immediately, having been determined according to the discontinuities present both in the source part $P_{PS}$ and in the destination part $P_{PD}$, on which the DMA controller can program its transfers.

The present invention can thus be used to manage the problems of discontinuity of the physical memory space in the context of DMA programming functions not supervised by the OS. It involves the memory management unit, and offers the guarantee that the user program initiating the DMA programming will not manipulate the physical addresses, which offers good protection against acts of piracy. It also provides for good performance in terms of processing speed.

All of the embodiments described above also do not allow the user program P that programs the DMA controller to have access to the addresses of the registers of the DMA controller, which provides protection against memory access violations.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodi-

What is claimed is:

1. A method for programming a DMA controller of a system on a chip, the system on a chip including a central processing unit, a memory management unit for translating virtual addresses into physical addresses according to a translation table which also contains the size of each page, a hardware contiguity checking module for checking contiguity, an address bus, a data bus, and the DMA controller, the DMA controller being programmable by applying, to at least one of the data bus and the address bus, programming elements comprising a source physical address, a destination physical address and a size for the data to be transferred, each user program being linked to a virtual address space and a physical memory space, organized in pages, and each address including high-order bits indicating a page associated with the address, the method comprising the steps of:

in response to dedicated instructions of a user program that deliver size information and a programming virtual address, which is a source virtual address or a destination virtual address, supplying, from the central processing unit, a transfer size to the hardware contiguity checking module and the programming virtual address to the memory management unit and the hardware contiguity checking module;

translating, by the memory management unit, the programming virtual address into a corresponding programming physical address;

supplying, from the memory management unit, the corresponding programming physical address to the hardware contiguity checking module;

determining, by the hardware contiguity checking module, a first discontinuity as a function of the transfer size supplied by the central processing unit and the corresponding programming physical address supplied by the memory management unit and stored in the translation table;

determining, by the hardware contiguity checking module, at least a first sub-block formed by a memory sub-space without discontinuity identified by a start physical address equal to the programming physical address and an end physical address equal to the physical address immediately preceding the first discontinuity in a part of the physical memory space corresponding, according to the translation table, to the part of the virtual address space beginning at the programming virtual address and of a size equal to the size information delivered by the user program;

defining at least a DMA transfer size for the DMA controller as a function of at least the first sub-block; and delivering programming elements including the DMA transfer size to the DMA controller by applying the programming elements to at least one of the address bus and the data bus, the DMA transfer size being coupled from the hardware contiguity checking module to the data bus, wherein the hardware contiguity checking module is coupled between the central processing unit and the memory management unit.

2. The method for programming a DMA controller according to claim 1, further comprising the steps of:

determining, by the hardware contiguity checking module, a first virtual address which is the start address of the virtual page indicated by the programming virtual address;

determining a size value equal to the size of the page associated with the programming physical address supplied by the memory management unit after translation of the programming virtual address; and delivering a first group of bits of the programming physical address indicating the physical page and the associated page size to the hardware contiguity checking module.

3. The method for programming a DMA controller according to claim 2, further comprising the steps of:

determining, by the hardware contiguity checking module, a first physical address, which is the start address of the physical page indicated, according to the first group of bits, determining a second virtual address equal to the sum of the first virtual address delivered and the first page size delivered, and supplying the second virtual address to the memory management unit;

translating, by the memory management unit, the second virtual address into a corresponding physical address, and determining a second size value equal to the size of the page associated with the physical address;

delivering a second group of bits of the physical address corresponding to the translation of the second virtual address and indicating the associated physical page and the second size value to the hardware contiguity checking module;

determining, by the hardware contiguity checking module, a second physical address, which is the start address of the physical page indicated, as a function of the second group of bits, comparing the second physical address with the sum of the first physical address and the first size value to detect at least one inequality between the second physical address and the sum;

repeating these steps of determining, translating, delivering, and determining by replacing the first virtual address with the second virtual address, the first page size with the second page size, and the first physical address with the second physical address, at least as long as the second physical address is equal to the sum of the first physical address and the first page size value; and when a first inequality is established, forming the first sub-block by the memory space without discontinuity between the physical address obtained by translation of the programming virtual address delivered by the instructions and the physical address equal to the sum, detected unequal to the second physical address, of the first physical address and the first page size value.

4. The method for programming a DMA controller according to claim 1, further comprising the step of:

in response to dedicated instructions of a user program that deliver a first programming virtual address equal to the source virtual address and a second programming virtual address equal to the destination virtual address:

forming, by the hardware contiguity checking module, a first source sub-block and a first destination sub-block, presenting respective sub-block sizes, and supplying the programming elements to the DMA controller that include the source physical address, the destination physical address, and the DMA transfer size, the DMA transfer size being equal to the smallest sub-block size out of the source sub-block size and the destination sub-block size.

5. The method for programming a DMA controller according to claim 1, further comprising the step of:

sending information to the user program, the information including at least one of a location in the virtual memory space of the first discontinuity, and the DMA transfer size delivered to the DMA controller, if the DMA transfer size is different from the size supplied by the user program.

6. The method for programming a DMA controller according to claim 1, further comprising the step of:
   forming, by the hardware contiguity checking module, a group of source sub-blocks, each sub-block being formed by a memory sub-space between two adjacent source limits, each sub-block being associated with a physical sub-block start address and a sub-block size, the source limits being:
   the source physical addresses obtained by translation of the source virtual addresses delivered by the user program,
   physical addresses deduced from the locations of the discontinuities determined in the source part of the physical memory space by the discontinuity module as a function of information supplied by the memory management unit, and
   the physical address equal to the translation by the memory management unit of the sum of the source virtual address and the size information delivered by the user program.

7. The method for programming a DMA controller according to claim 6, further comprising the steps of:
   storing, by the hardware contiguity checking module, data determined as a function of the physical block start addresses and the sub-block sizes associated with the group of source sub-blocks in a given page associated with a physical page address; and
   programming the DMA controller according to the data stored in the given page.

8. A system on a chip comprising:
   a central processing unit;
   a memory management unit for translating virtual addresses into physical addresses according to a translation table which also contains the size of each page;
   a hardware contiguity checking module coupled between the central processing unit and the memory management unit;
   an address bus;
   a data bus;
   a DMA controller coupled to the address bus and the data bus, the DMA controller being programmable by applying, to at least one of the data bus and the address bus, programming elements comprising a source physical address, a destination physical address, and a size of data to be transferred;
   a memory coupled to the address bus and the data bus,
   wherein a virtual address space for each user program corresponds to a physical memory space in the memory, organized as pages,
   each address includes high-order bits indicating a page associated with the address,
   in response to dedicated instructions of a user program that deliver size information and a programming virtual address, which is a source virtual address or a destination virtual address:
     the central processing unit supplies a transfer size to the hardware contiguity checking module and the programming virtual address to the memory management unit and the hardware contiguity checking module;
     the memory management unit translates the programming virtual address into a corresponding programming physical address;
     the memory management unit supplies the corresponding programming physical address to the hardware contiguity checking module;
     the hardware contiguity checking module determines at least a first sub-block of memory space without discontinuity identified by a start physical address equal to the programming physical address and an end physical address equal to the physical address immediately preceding a first discontinuity in a part of the physical memory space corresponding, according to the translation table, to the part of the virtual address space beginning at the programming virtual address and of a size equal to the size information delivered by the user program, the hardware contiguity checking module determining the first discontinuity as a function of the transfer size supplied by the central processing unit and the corresponding programming physical address supplied by the memory management unit and contained in the translation table; and
     programming elements including the DMA transfer size are delivered to the DMA controller by applying the programming elements to at least one of the address bus and the data bus, the DMA transfer size being coupled from the hardware contiguity checking module to the data bus, and
   the hardware contiguity checking module defines at least a DMA transfer size for the DMA controller as a function of at least the first identified sub-block.

9. The system on a chip according to claim 8,
   wherein the hardware contiguity checking module determines a first virtual address,
   which is the start address of the virtual page indicated by the programming virtual address, and determines a size value equal to the size of the page associated with the programming physical address supplied by the memory management unit after translation of the programming virtual address, and
   the memory management unit delivers a first group of bits of the programming physical address indicating the physical page and the associated page size to the hardware contiguity checking module.

10. The system on a chip according to claim 9,
    wherein the hardware contiguity checking module determines, as a function of the first group of bits, a first physical address which is the start address of the physical page indicated, determines a second virtual address equal to the sum of the first virtual address delivered and of the first page size delivered, and supplies the second virtual address to the memory management unit,
    the memory management unit translates the second virtual address into a corresponding physical address, determines a second size value equal to the size of the page associated with the physical address, and delivers a second group of bits of the physical address corresponding to the translation of the second virtual address and indicating the associated physical page and the second size value to the hardware contiguity checking module,
    the hardware contiguity checking module is designed to determine, as a function of the second group of bits, a second physical address which is the start address of the physical page indicated, and compares the second physical address with the sum of the first physical address and the first size value to detect at least one inequality between the second physical address and the sum,
    the hardware contiguity module and the memory management unit replace the first virtual address with the second virtual address, the first page size with the second page size and the first physical address with the second physical address, and repeat this processing at least as long as the second physical address is equal to the sum of the first physical address and the first page size value, and the hardware contiguity checking module, when a first inequality is established indicating a first discontinuity, forms a first sub-block of memory space without discontinuity between the physical address obtained by translation of the programming virtual address delivered by the instructions, and the physical address equal to the sum, detected unequal to the second physical address, of the first physical address and the first page size value.

11. The system on a chip according to claim 8, wherein in response to dedicated instructions of a user program that deliver a first programming virtual address equal to the source virtual address and a second programming virtual address equal to the destination virtual address:

the hardware contiguity checking module forms a first source sub-block and a first destination sub-block, presenting respective sub-block sizes, and the programming elements supplied to the DMA controller include the source physical address, the destination physical address and the DMA transfer size the DMA transfer size being equal to the smallest sub-block size out of the source sub-block size and the destination sub-block size.

12. The system on a chip according to claim 8, wherein the hardware contiguity checking module also sends information to the user program, the information including at least one of a location in the virtual memory space of the first discontinuity and the DMA transfer size delivered to the DMA controller, if the DMA transfer size is different from the size supplied by the user program.

13. The system on a chip according to claim 8, wherein the hardware contiguity checking module forms a group of source sub-blocks, each sub-block being formed by a memory sub-space between two adjacent source limits, each sub-block being associated with a sub-block start physical address and a sub-block size, the source limits being:

the source physical addresses obtained by translation of the source virtual addresses delivered by the user program, physical addresses deduced from the locations of the discontinuities determined in the source part of the physical memory space, by the discontinuity module according to information supplied by the memory management unit, and the physical address equal to the translation by the memory management unit of the sum of the source virtual address, and the size delivered by the user program.

14. The system on a chip according to claim 13, wherein the hardware contiguity checking module stores, in a given page associated with a physical page address, data determined as a function of the block start physical addresses and the sub-block sizes associated with the group of source sub-blocks, the programming elements delivered to the DMA controller include the physical page address, and the DMA controller is programmed according to the data stored in the page.

15. An electronic device including at least one system on a chip, the system on a chip comprising:

a central processing unit;

a memory management unit for translating virtual addresses into physical addresses according to a translation table which also contains the size of each page;

a hardware contiguity checking module coupled between the central processing unit and the memory management unit;

an address bus;

a data bus;

a DMA controller coupled to the address bus and the data bus, the DMA controller being programmable by applying, to at least one of the data bus and the address bus, programming elements comprising a source physical address, a destination physical address, and a size of data to be transferred;

a memory coupled to the address bus and the data bus, wherein a virtual address space for each user program corresponds to a physical memory space in the memory, organized as pages, each address includes high-order bits indicating a page associated with the address, in response to dedicated instructions of a user program that deliver size information and a programming virtual address, which is a source virtual address or a destination virtual address:

the central processing unit supplies a transfer size to the hardware contiguity checking module and the programming virtual address to the memory management unit and the hardware contiguity checking module;

the memory management unit translates the programming virtual address into a corresponding programming physical address;

the memory management unit supplies the corresponding programming physical address to the hardware contiguity checking module;

the hardware contiguity checking module determines at least a first sub-block of memory space without discontinuity identified by a start physical address equal to the programming physical address and an end physical address equal to the physical address immediately preceding a first discontinuity in a part of the physical memory space corresponding, according to the translation table, to the part of the virtual address space beginning at the programming virtual address and of a size equal to the size information delivered by the user program, the hardware contiguity checking module determining the first discontinuity as a function of the transfer size supplied by the central processing unit and the corresponding programming physical address supplied by the memory management unit and contained in the translation table; and programming elements including the DMA transfer size are delivered to the DMA controller by applying the programming elements to at least one of the address bus and the data bus, the DMA transfer size being sent from the hardware contiguity checking module to the data bus, and the hardware contiguity checking module defines at least a DMA transfer size for the DMA controller as a function of at least the first identified sub-block.

16. The electronic device according to claim 15, wherein the hardware contiguity checking module determines a first virtual address, which is the start address of the virtual page indicated by the programming virtual address, and determines a size value equal to the size of the page associated with the programming physical address supplied by the memory management unit after translation of the programming virtual address, and the memory management unit delivers a first group of bits of the programming physical address indicating the physical page and the associated page size to the hardware contiguity checking module.

17. The electronic device according to claim 15, wherein in response to dedicated instructions of a user program that deliver a first programming virtual address equal to the source virtual address and a second programming virtual address equal to the destination virtual address:

the hardware contiguity checking module forms a first source sub-block and a first destination sub-block, presenting respective sub-block sizes, and the programming elements supplied to the DMA controller include the source physical address, the destination physical address and the DMA transfer size, the DMA transfer size being equal to the smallest sub-block size out of the source sub-block size and the destination sub-block size.

18. The electronic device according to claim 15, wherein the hardware contiguity checking module also sends information to the user program, the information including at least one of a location in the virtual memory space of the first discontinuity and the DMA transfer size delivered to the DMA controller, if the DMA transfer size is different from the size supplied by the user program.

19. The electronic device according to claim 15, wherein the hardware contiguity checking module forms a group of source sub-blocks, each sub-block being formed by a memory sub-space between two adjacent source limits, each sub-block being associated with a sub-block start physical address and a sub-block size, the source limits being:

the source physical addresses obtained by translation of the source virtual addresses delivered by the user program, physical addresses deduced from the locations of the discontinuities determined in the source part of the physical memory space, by the discontinuity module according to information supplied by the memory management unit, and the physical address equal to the translation by the memory management unit of the sum of the source virtual address, and the size delivered by the user program.

20. The method for programming a DMA controller according to claim 1, wherein the translating step is performed in response to a first dedicated instruction of the user program that includes an address argument indicating the programming virtual address, the translating step comprises storing the corresponding physical address in a buffer register that cannot be accessed by the user program, and the method further comprises the step of, in response to a second dedicated instruction of the user program, which is different than and after the first dedicated instruction, applying to the data bus the programming physical address stored in the buffer register and applying to the address bus a word that includes at least high-order bits indicating a base subaddress of programming registers of the DMA controller.

21. The method for programming a DMA controller according to claim 20, wherein in response to a second iteration of the first dedicated instruction, the DMA transfer size is applied to the data bus and the word that includes at least high-order bits indicating the base subaddress of the programming registers of the DMA controller is applied to the address bus.

22. The method for programming a DMA controller according to claim 20, wherein the user program does not have access to the physical addresses of the physical memory space.

* * * * *